Sept. 16, 1952 W. B. SMITH 2,610,542
APPARATUS FOR ANALYZING A CURVE UPON A CHART
Filed Oct. 10, 1947 2 SHEETS—SHEET 1
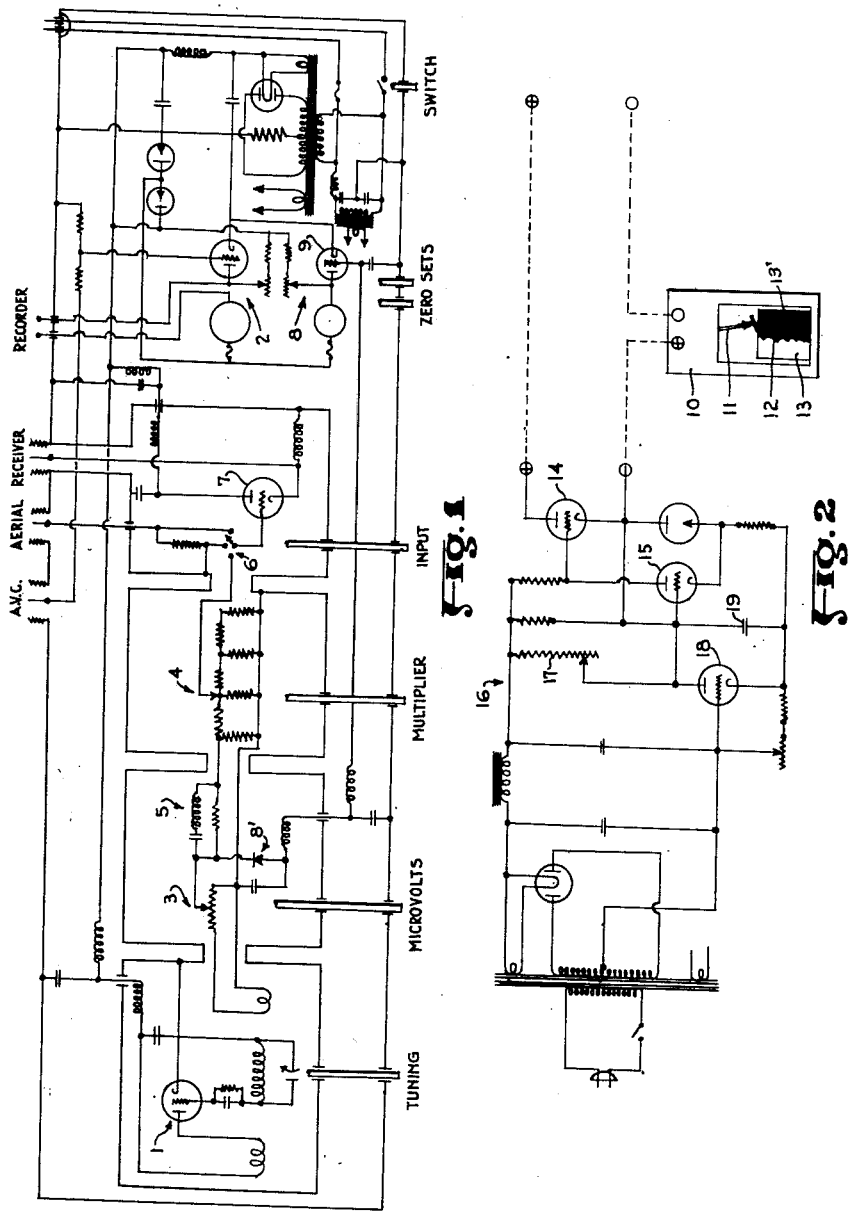
INVENTOR.
Wilbert Brockhouse Smith
BY
Alex E. MacRae
Attorney.

Sept. 16, 1952          W. B. SMITH          2,610,542
APPARATUS FOR ANALYZING A CURVE UPON A CHART
Filed Oct. 10, 1947          2 SHEETS—SHEET 2
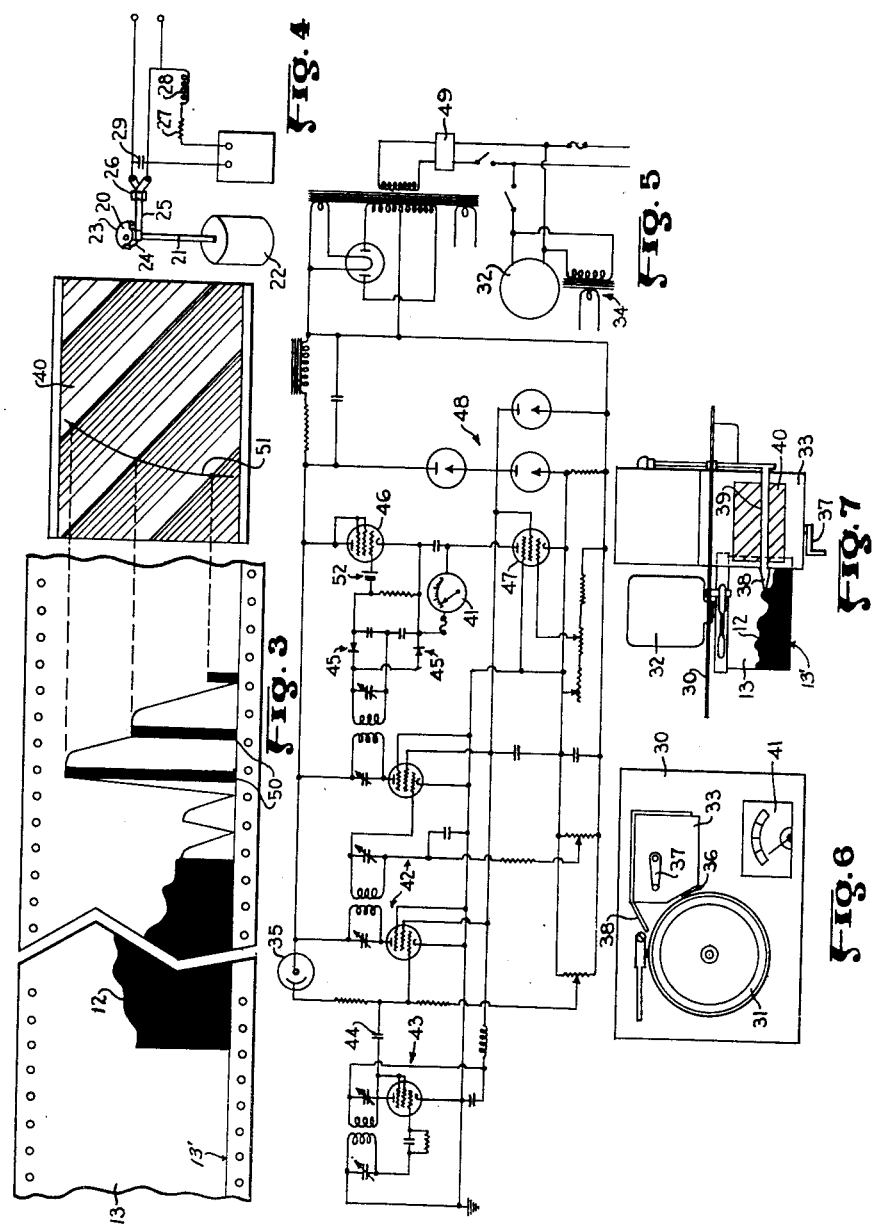
INVENTOR.
Wilbert Brockhouse Smith
BY
Alex E. MacRae
Attorney.

Patented Sept. 16, 1952

2,610,542

UNITED STATES PATENT OFFICE 2,610,542

APPARATUS FOR ANALYZING A CURVE UPON A CHART

Wilbert Brockhouse Smith, Ottawa, Ontario, Canada

Application October 10, 1947, Serial No. 779,158

4 Claims. (Cl. 88—14)

This invention relates to a means for graphically recording information and for analysing the graphically recorded information.

Graphically recorded curves on charts, representing varying values of subjects under consideration, such as temperature, pressure, radio signals, liquid levels, and many others, are useful or essential in many fields. Detailed analysis of the information provided by the curves frequently entails, however, much effort and involved mathematical calculations.

As an instance of the use of such equipment, there may be mentioned the recording of skywave signals from radio broadcasting stations. As is well known, a good deal of the energy radiated from standard brand broadcasting stations is reflected from the ionosphere and returns to earth at a distance from the station. This phenomenon is an advantage in the case of clear channel stations since it augments the coverage, but where channels are shared by two or more stations in the same region it becomes a decided nuisance and produces interference which seriously limits the coverage which otherwise would be obtained.

Therefore, in the broadcast allocation structure due cognizance must be taken of the effects of skywave signals. Ground wave propagation is calculated from verified theoretical curves, but because of the many indeterminable factors involved in skywave propagation, no corresponding curves exist, and calculations must be made from entirely empirical curves. These curves are plotted from measured data on the skywave signal intensities of distant stations over an extended period, and are based on the signal exceeded for certain percentages of time. Integration of the time during which a particular value of signal is exceeded has been a prolonged and labour-consuming operation.

An object of the present invention is to provide a means for preparing a graphically recorded chart having a curve representative of varying values of a subject under consideration and having the area on one side of the curve inked in to provide a non-reflective surface, and for photoelectrically scanning the curve along a longitudinal band or bands to integrate the time during which a particular value of the subject is exceeded.

The invention will be described with reference to the accompanying drawings, wherein one embodiment of the invention is illustrated, and in which Figure 1 is a circuit diagram of a signal generator unit, Figure 2 is a circuit diagram of a recording set with means for periodically returning the recorder pen to zero, Figure 3 is a plan view of the charts employed, Figure 4 is a perspective view of a modified means for returning the recorder pen to zero, Figure 5 is a circuit diagram of an electronic chart scanning means, Figure 6 is a side elevation of the chart scanning unit, and Figure 7 is a partial plan view of the chart scanning unit.

Referring to Figure 1, the signal generating circuit shown is particularly adapted for use in recording varying signal intensities of broadcasting stations in the standard broadcast band. The equipment comprises two major units, namely, a standard signal generator having a triode oscillator 1 and a vacuum tube voltmeter 2 actuated from the automatic volume control voltage in a receiving set, as indicated, to produce a proportionally fluctuating current in a graphical recorder. As shown in the circuit, the radio frequency output from the oscillator is delivered to a potentiometer 3 which serves as a microvolt control. The varying output from this potentiometer is fed to a step attenuator 4, which serves as a multiplier control, through a calibration resistor 5 the value of which is selected so that the microvolt output will equal the product of the milliamperes indicated on the the meter of a vacuum tube voltmeter 8 and the position of the multiplier. The peak value of the R. F. voltage applied to the attenuator and its calibration resistor is rectified by means of a germanium crystal rectifier 8' and applied negatively, through suitable filtering, to the grid of the triode 9 which serves as the vacuum tube voltmeter 8 to provide a reading of the R. F. voltage applied to the attenuator.

The output of the step attenuator is connected to one point of a three position switch 6. The center position of this switch is grounded to its containing box, and its third point is connected to the aerial input plug. The arm of the switch is connected to the grid of a triode 7, which functions as a cathode follower, delivering a proportional voltage to the antenna output of the receiver.

Referring to Figure 2, the AVC voltage is fed to a vacuum tube amplifier which drives the graphical recorder 10 having a pen 11 adapted to record a curve 12 on a chart 13 representative of the varying signal intensity.

It is essential, for the purpose of the present invention, that the area between the curve 12 and zero, as indicated by the line 13' extending longitudinally of the chart 13 and represented by, or parallel and adjacent to, one longitudinal edge of the chart, be inked in to provide a non-light-reflecting surface. Various means may be provided for this purpose, two of which will be described by way of example. The electronic means shown in Figure 2 is particularly effective, and comprises a device for periodically returning the recorder pen 11 to zero. It consists of a small resistance in series with the recorder, which resistance remains constant for about four-fifths of the cycle, and then increases to infinity over the remaining one-fifth, after which it suddenly returns to its previous value and the cycle starts over again.

The resistance which performs in this unusual manner is the plate resistance of a triode 14, the grid of which is held about 4 volts positive for the first four-fifths of the cycle. Under these conditions the tube shows a linear plate resistance characteristic of about 300 ohms plus or minus depending upon the individual tubes, and is valid for currents as high as 8 milliamperes, for instance. Hence, it follows that the insertion of this resistance in series with a 5 milliampere recorder will not appreciably upset its response or accuracy.

The grid of the variable resistance tube 14 is connected to the plate of another triode 15, which acts as a control tube to translate the voltage developed by a relaxation oscillator 16 into an increasing bias. Since the control tube is biased well beyond cut-off for four-fifths of the cycle developed by the relaxation oscillator, it does not come into action until the last one-fifth of the cycle. It then diverts the current previously flowing through the grid circuit of the output tube 14, permitting the bias of that element to increase to cut-off.

The relaxation oscillator 16 is of conventional type, being a condenser 19 charged through a high resistance 17 and discharged through a thyratron 18. By using a tapped resistance of total value about 30 and a 1 microfarad oil-filled paper condenser, good stability was obtained with periods from 1 to 5 seconds long. For chart speeds of 1 foot per hour the 5 second period is required, but for faster speeds a corresponding faster rate applies.

The operation will be clear from the foregoing description. The thyratron 18 provides the pulses which determine the time of the cycle of operations. As its potential increases, the coupling tube 15 comes into action and reduces the potential of the grid of the output tube 14 to cut-off. This latter action occupies the last one-fifth of the cycle, after which the condenser discharges through the thyratron and the cycle is repeated. As the grid bias of the output tube 14 moves from slightly positive to negative cut-off, the plate resistance increases to infinity, and the recorder pen consequently moves to zero. It has been found that a "cycler," operating as described, produces a chart as shown in Figure 3, wherein the area between the curve 12 and zero is fully inked in with the ink from the recorder pen.

An example of electro-mechanical means for periodically returning the recorder pen to zero to ink in the chart is diagrammatically illustrated in Figure 4. As shown, a cam 20 is mounted on a shaft 21 rotated by a motor 22. The cam has two arcuate cam surfaces 23 and 24, surface 23 having a greater radius than surface 24. A contact arm 25 rides on the cam surfaces and operates a switch 26 to open and close the circuit 27 of the recorder 10. The circuit may be closed when the arm is in contact with surface 23 and opened when the arm is in contact with surface 24. The circuit includes a resistance 27, inductance 28 and condenser 29, which may be selected for critical damping and convenient period of cycle, corresponding to the rate of cycling, which is determined by the speed of the motor.

Referring to Figures 3, 5, 6 and 7, analysis of the produced chart 13 is accomplished by means of the scanning apparatus shown. The device comprises a frame 30, a scanning drum 31 carried thereon and on the circumferential surface of which is mounted the chart 13, a driving motor 32 for revolving the drum, and a lamp house 33. Mounted within the lamp house is a carriage of usual type (not shown) and carrying an exciter lamp 34 and a photoelectric cell 35 with necessary associated lenses to focus the light rays 36, through an appropriate aperture in the lamp house, on the chart. Diffused reflected light from the chart is picked up by the photocell in the usual manner. A crank 37 is provided to reciprocate the carriage and position the light source and photocell in desired relation to the chart. A pointer 38 is arranged to track with the path along the chart taken by the light spot. The pointer carries a straight edge 39 which extends across a special logarithmic chart 40 mounted on the top of the lamp house. A meter 41 is also provided.

The electronic section of the scanner is shown in the diagram of Figure 5. It consists of a two-stage photocell amplifier 42 responsive to standard IF of 456 kc. but biased normally slightly beyond cut-off. This amplifier is supplied with 456 kc. excitation from an oscillator 43 through a very small condenser 44 but does not come into action until the bias on its first stage is reduced by the illumination of the photocell. The output of the amplifier is rectified by two germanium rectifiers 45 in a doubler circuit, and applied to the grid of a triode-connected pentode 46, which is in series with a saturation pentode 47 and the meter 41.

When the photocell is not illuminated there is no appreciable output from the amplifier and the grid of the triode 46 is maintained at zero potential by a flashlight battery 52, permitting the full saturation current of 1 milliampere to flow through the saturation pentode and give a full scale reading on the meter. This condition corresponds to the scanning of a completely inked-in portion of a chart undergoing analysis.

When the photocell is illuminated the amplifier comes into action and produces at the output of the germanium rectifiers 50 volts or more, which produces immediate cut-off of the triode, and for the period when this condition prevails no current flows through the meter. This corresponds to the scanning of a blank portion of the chart.

Since the meter is of the uniform scale type, it will read the average current flowing through it, providing that the scanning drum cycle is fast enough to prevent the meter movement from following the individual fluctuations. In other words, the scanning drum cycle must be quite short compared with the natural period of the meter movement. Therefore, the recurring cycles pursuant to the revolution of the drum will result in the meter pointer reading an average current rather than the actual current passing through it periodically. Hence, it follows that in the scanning operation the average current reading of the meter will be directly proportional to the period of time during which the photocell has not been illuminated, and thus directly proportional to the period of time a certain signal strength has been exceeded.

Various stabilized voltages for the operation of the photocell, amplifier, and meter circuit are obtained from a series-parallel arrangement of gaseous voltage regulator tubes 48. Additional stabilization is obtained from a constant voltage transformer 49 on the power input to the electronic circuits.

A series of calibration marks 50 are preferably provided on the chart, such marks representing known values of, for instance, particular field intensities, for the purpose of establishing the scale of the chart.

The chart to be scanned is mounted on the drum 31, with the base or zero line towards the front in such manner that the calibration marks are visible on the outside of the drum. The drum is then rotated by hand until each of the calibration marks is in line with the pointer 38, and the crank 37 wound around until the index on the pointer coincides with the top of each calibration mark. Corresponding with the top of each calibration mark a line is drawn along the straight edge 39, intersecting one of the unit lines on the logarithmic chart 40. When each calibration has been transferred to the graph in this manner a French curve is used to join up the points of intersection of the calibration lines with the unit lines thereon. A typical curve 51, representing the relationship existing between the known values as indicated by the marks 50, is shown in Figure 3.

The chart is then shifted on the drum so that a recording period centering around sunset is in a position for scanning, and with no portions of blank chart visible on the outside of the drum. The scanning motor is then turned on to revolve the drum at a suitable speed. The pointer 38 is then manually moved to a position with relation to the chart at which the meter reading corresponds to a particular period of time for which a field intensity reading is desired. When this indication on the meter is reached, the intersection of the straight edge 39 and the curve 51 indicates the value of field intensity in microvolts per meter which has been exceeded for that period of time. This scanning procedure is then repeated for each period of time for which a field intensity reading is desired.

While one specific method of scanning and analysing a chart has been described, it will be appreciated that this method may be varied for the purpose of analysing other types of information provided by charts in different fields. In other words, the broad idea of photoelectrically scanning along a longitudinal band or bands on a chart bearing a curve and having the area on one side of the curve provided with a non-light-reflecting surface, may be readily utilized in many fields to provide a useful and rapid analysis of desired information.

Heretofore, determination of the percentage of time that a certain value is exceeded has been accomplished by involved measurements and calculations from the curve on the chart, with resultant expenditure of much time and energy. The present invention enables such percentage of time to be determined with a minimum of effort and in a fraction of the time previously required.

What is claimed is:

1. Apparatus for analysing a chart comprising an elongated strip having thereon a zero line parallel to and adjacent one longitudinal edge, and a curve, the entire surface on the chart between the curve and the zero line being filled in with a substantially non-light-reflecting material, the remaining surface of the chart being light-reflecting, said apparatus comprising a frame, a drum revolvably mounted in the frame, said chart being arranged to be mounted on the circumferential surface of the drum, a lamp mounted on the frame in normally fixed and opposite relation to said circumferential surface and arranged to direct a beam of light onto the chart thereon, means for revolving the drum to cause longitudinal travelling movement of the chart with respect to the light beam, a photoelectric cell mounted on the frame in fixed relation to said lamp and responsive to light rays reflected from said reflecting surface portion of the chart when positioned on said circumferential surface, said cell being thereby excited only during the time said beam of light traverses said reflecting surface portion of the chart, an electronic device connected to said cell for converting the output thereof into direct current, and a meter electrically connected to the current output of said device to provide a measurement thereof.

2. Chart analysing apparatus as defined in claim 1, wherein said electronic device includes an oscillator for converting the output of the cell into an alternating current, an amplifier for amplifying the alternating current, and a rectifier for converting the output of the amplifier into direct current.

3. Apparatus for analysing a chart comprising a frame, a drum revolvably mounted in the frame and adapted to receive a chart on the circumferential surface thereof, a motor for revolving the drum, a lamp house mounted on the frame and having therein an exciter lamp and a photoelectric cell in exposed relation to said circumferential surface, an electronic device connected to the cell and including an oscillator for converting the output of the cell into an alternating current, an amplifier for amplifying the alternating current, and a rectifier for converting the output of the amplifier into direct current, and a meter connected to the direct current output of said device to provide a measurement thereof.

4. Chart analysing apparatus as defined in claim 3, including a logarithmic scale mounted on said house, a pointer carried by the frame and extending into proximity with said circumferential surface to substantially coincide with a light spot thereon produced by said exciter lamp, and a straight edge carried by the pointer and extending across said logarithmic chart.

WILBERT BROCKHOUSE SMITH.

REFERENCES CITED

The following references are of record in the file of this patent:

UNITED STATES PATENTS

| Number | Name | Date |
|---|---|---|
| 2,010,271 | Mylting | Aug. 6, 1935 |
| 2,098,326 | Wente | Nov. 9, 1937 |
| 2,139,295 | Woodling | Dec. 6, 1938 |
| 2,261,192 | Townsend | Nov. 4, 1941 |
| 2,306,391 | Keinath | Dec. 29, 1942 |
| 2,341,407 | Xenis et al. | Feb. 8, 1944 |
| 2,359,934 | Nokes et al. | Oct. 10, 1944 |
| 2,360,883 | Metcalf | Oct. 24, 1944 |
| 2,395,482 | Hurley | Feb. 26, 1946 |